Dec. 30, 1958 H. E. R. GRUNER ET AL 2,866,382
STEREOSCOPIC VIEWING DEVICE
Filed Sept. 9, 1957
2 Sheets-Sheet 1
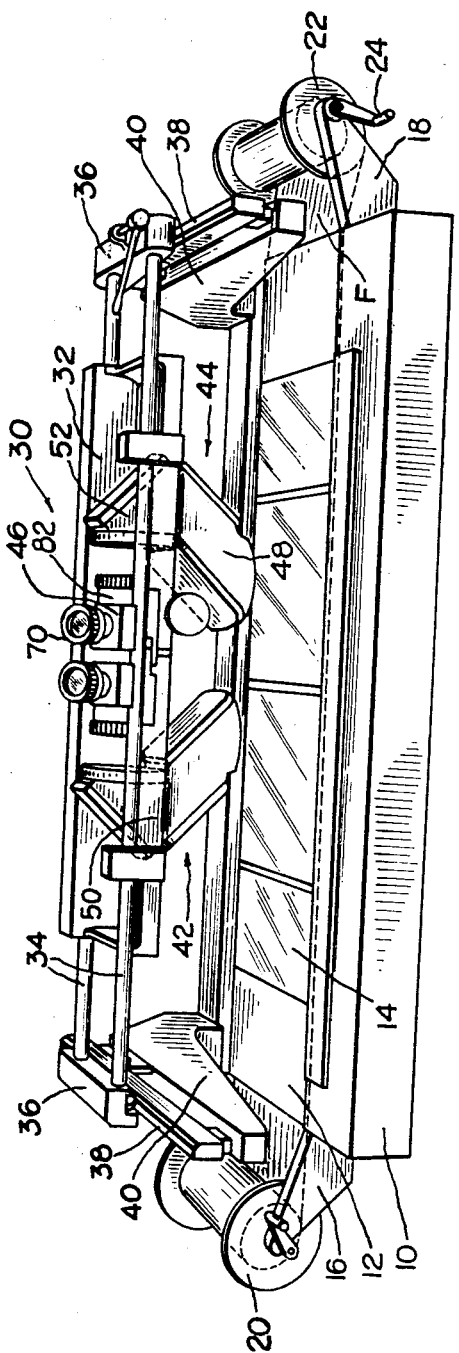
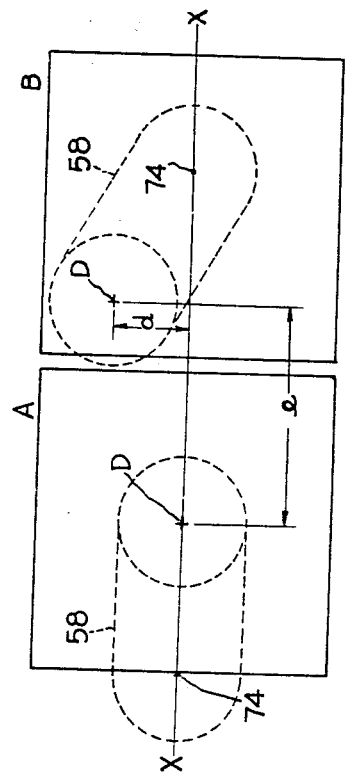
INVENTORS
HEINZ E. R. GRUNER
FRIEDRICH SCHWARZBACH
BY
ATTORNEYS

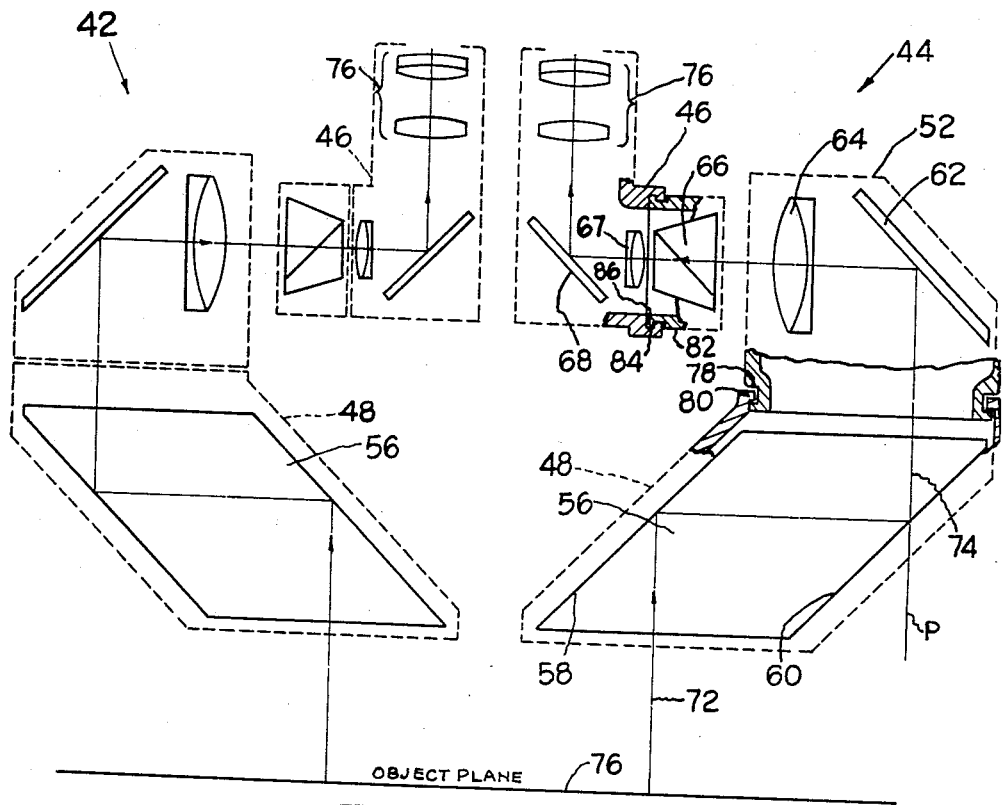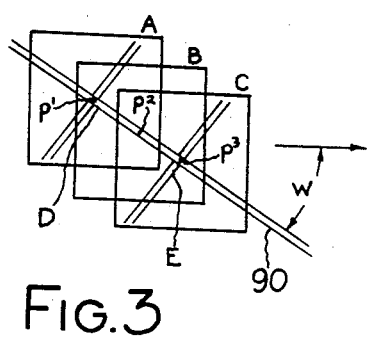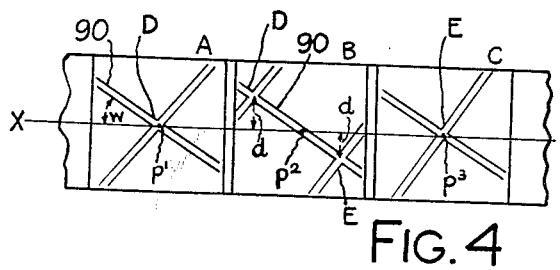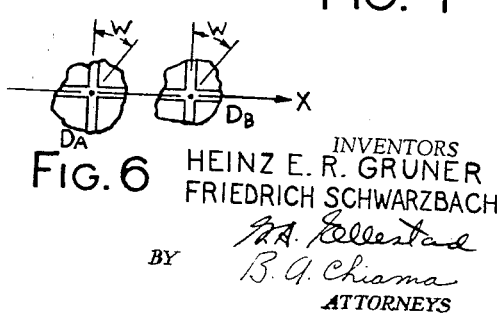

United States Patent Office 2,866,382
Patented Dec. 30, 1958

2,866,382

STEREOSCOPIC VIEWING DEVICE

Heinz E. R. Gruner and Friedrich Schwarzbach, Irondequoit, N. Y., assignors to Bausch & Lomb Optical Company, Rochester, N. Y., a corporation of New York Application September 9, 1957, Serial No. 682,802

2 Claims. (Cl. 88—29)

The present invention relates generally to stereoscopic viewing devices and more particularly to viewing devices for aerial photographs for purposes of photo-interpretation mapping, or other surveying.

In the practice of surveying by aerial photography, it has been customary to take continuous or serial photographs of an area to be surveyed in such a way that successive pairs of the photographs overlap to a certain extent. The overlapped portions of such pairs of photographs may be viewed by a stereoscopic viewing instrument since the two photographs present different perspective views of the terrain which when separately presented to the observer's eyes appear as a three-dimensional optical reproduction of the terrain photographed.

The stereoscopic viewing instrument for this practice usually employs a pair of eyepieces each of which serves to transmit the image of one of the photographs to the observer through the medium of a receptor section associated with each of the eyepieces. These optical components are usually supported by a framework which stands on a table. The two photographs, usually paper prints, are positioned under the stereoscope and oriented so that two conditions are met. First, the base of observation, i. e., the line connecting the eyepiece centers, becomes parallel to the photographic base of the two pictures, i. e., the line, which on each photograph, connects its center with an image point corresponding to the center of the other photograph. The second condition of this orientation is, that image points representing the same terrain object are spaced sufficiently far apart on lines parallel to the base of observation that they can be viewed with the lines of sight through the eyepieces approximately parallel.

The disadvantages of the present day practice of this method of orientation and examination are that the stereofusion is easily lost by the operator if the mutual orientation of the photographs is not sufficiently achieved and if the parallelism between photobase and observation base becomes lost by the necessity of either shifting the stereoscope or the pair of photographs while exploring the area of overlap, which seldom can be fully viewed at one setting.

It is customary to express the relationship between corresponding image points by a system of rectangular coordinates. The $x$-axis of such systems contains the eye base and $y$-axis passes thorugh one end of the base of observation. The coordinate differences of corresponding image points in this system are called $x$- and $y$-offsets. It is the objective of the aforementioned practice of reciprocal orientation of the photobase to reduce these offsets to very small magnitudes in order to experience the fusion of the two images into one seen in three dimensions. It is for this reason, that in ordinary stereoscopes the two photographs must be independently moveable.

On uncut film rolls or strips of paper copies therefrom, containing consecutive overlapping exposures taken in aerial flight, the prerequisites for stereo observation are usually not fulfilled for several reasons. Most notable is the drifting of the aircraft when relatively high crosswinds are present at the desired altitude and the camera in the aircraft has not been rotated to make its format sides squared with the true course over the ground. Similar results are attained if the desired topographical feature is a winding mountain range or river and the aircraft is flown at intermittent and alternate levels in order to insure that the camera will be positioned exactly above the topographical feature. Offset may result in the event the aircraft is suddenly displaced from a level flight by atmospheric conditions.

A second still more serious obstacle to stereo examination of uncut consecutive photographs is the direction in which the film band in the camera magazine was advanced over the camera focal plane between the individual exposures. Although it is general practice to install the camera in the aircraft in such a manner that the film passes over the focal plane in a direction parallel to the forward movement of the aircraft in flight, in which case overlapping areas appear side by side in the negative, certain mounting conditions and camera designs demand a departure from this convention and advance the film in the opposite or transverse direction. Corresponding images appear then on longitudinally or transversely opposite sides of the consecutive exposures. These conditions require new optical means, if stereo observation shall be made possible without the freedom of changing the physical relationships of images on the film or paper materials.

It is the principal object of the present invention to provide a stereoscopic viewing device which permits immediate viewing of an uncut film regardless of the aircraft attitude during which the film has been exposed or the orientation of the camera with respect to the longitudinal axis of the aircraft or the line of flight, or the manner in which the film was advanced through the camera from exposure to exposure.

Another object of the invention is to provide an optical means for permitting orientation and stereoscopic observation of offset image points regardless of the degree of offset in the $x$- and $y$-directions.

These and other objects and advantages reside in certain novel features of construction, arrangement and combination of parts as will hereinafter be more fully described, pointed out in the appended claims, and will appear when taken in conjunction with the accompanying drawing wherein:

Fig. 1 is a perspective view of the stereoscopic viewing device embodying the present invention;

Fig. 2 is a digrammatic illustration of the optical system used in the device of Fig. 1;

Fig. 3 is a diagrammatic illustration of a series of photographs taken along a line of flight and of a typical topographical feature;

Fig. 4 is a diagrammatic illustration of a serial strip of film and the topographical feature as it will actually look when removed from the camera:

Fig. 5 is a diagrammatic illustration of the objective receptors of the present invention in their relationship with offset image points taken from the photograph of Fig. 4; and Fig. 6 is a fragmentary diagrammatic illustration of the serial strip as it is viewed in the eyepieces of the present invention.

Referring now to the drawing and particularly Fig. 1, there is shown a stereoscopic viewing device mounted upon a base 10 having a table 12 provided with a working area of glass 14 which may be edge-illuminated by suitable fluorescent lamps (not shown). Two sets of film brackets 16, 18 are attached to the ends of the base 10 and these serve to hold spools 20, 22 for film or rolls of paper prints. Suitable cranks 24, associated with each of the spools, serve to reel a film or print band F, in either direction, upon the table 12. The band F slides upon the working area 14 with its rear edge in a guide rail 26 and with its front edge under a hinged flap 28 which cooperates with the rail 26 to hold the band F sufficiently flattened against the glass surface.

The band F is adapted to be viewed by a binocular viewing system, generally indicated by the reference numeral 30, which is mounted on a carriage 32. The carriage 32 is movable longitudinally above the table 12 and is adapted to slide upon a pair of parallel cylindrical rods 34 which form the runways for the carriage. This movement of the carriage 32 and the viewing system 30 is in the direction of the film or paper band and for purposes of later description, this movement will be designated the x-movement, a term customarily used in the art, and which is parallel to the base of observation.

The carriage 32 is also movable in a transverse direction and to this end there are provided supports 36 for the ends of the rods 34. The supports 36 are adapted to slide upon tracks 38 which are mounted at the ends of the base 10 and above the table 12. The tracks 38 and consequently the rods 34, carriage 32 and the viewing system 30 are supported above the working area by two cantilever castings 40 mounted on the rear edge of the base. For purposes of later description, the movement of the carriage in the transverse direction will be designated the y-movement. While not shown, it will be understood that the movement of the carriage 32 with respect to the rods 34 and the movement of the supports 36 upon the tracks 38 may be accomplished by suitable rack and pinion devices as is known in the art. Such devices usually provide means for permitting free manual sliding movement of the optical carriage and means for locking the carriage from movement in either direction. Since these devices form no part of the present invention and are quite common in stereoscopic viewing instruments, further description thereof is not necessary.

The binocular viewing system comprises two individual but optically identical viewing units 42, 44 which are supported on the carriage 32. For brevity, only one of these units will be described in detail but it will be understood that the terms and characteristics of one of the optical system units will apply to the other. As shown in Figs. 1 and 2, each of the units comprises an eyepiece section 46 and a receptor section 48, the former being fixedly secured upon the carriage 32 and the latter being fixed to a slide element 50 which forms a movable part of the carriage. The slide elements 50 may be moved toward and away from each other individually or by equal amounts along the x-axis by a suitable rack and pinion mechanism (not shown). Each of the viewing units then comprises a stationary section and a movable section when the carriage 32 is held immobile with respect to the table 12.

The receptor 48 comprises a first housing 52 fixed to the slide 50 and a lower housing 54 rotatably secured and depending from the housing 52. The housing 54 has mounted therein a rhomboid prism 56 which has two internal reflecting surfaces 58, 60. The surface 58 is adapted to be positioned above the photograph in observation for transmitting the image thereof through the prism to the other reflecting surface 60 which in turn will transmit the image rays vertically to be reflected by a mirror 62 mounted in the upper housing 52. The reflected image rays are then collimated by lenses 64 which are mounted in a suitable opening formed in the housing 52. The collimated image rays are then projected from the housing 52 and are transmitted through an erecting prism 66, an image forming system 67, and reflected by a mirror 68, both of which are mounted in the eyepiece section 46 and are brought to focus in the focal plane of an eyepiece 70 mounted upon the housing 46. The optical path for this system is indicated by the line 72, as shown in Fig. 2. A portion 74, of the optical path, between the reflecting surface 60 and the mirror 62 is perpendicular to the object plane 76.

Pivotal movement between the eyepiece section 46 and the receptor 48 about an axis P which is coincident with the portion 74 of the optical path 72 is provided for and to this end, the housing 52 has an annular groove 78 formed on the outer periphery thereof. An annular rim 80 is formed on the upper periphery of the receptor 48 and is of such an internal diameter as to be rotatably retained within the groove 78. The rhomboidal section 56 may be manually rotated through 360° and since each of the viewing units 42, 44 is provided with a rhomboid, the receptor for each of the units is made independently rotatable for a purpose which will appear hereinafter.

The erecting prism 66 is mounted in a sleeve 82 having formed at one end thereof an annular groove 84 which rotatably retains an annular rim 86 formed on the adjacent end of the eyepiece section 70. In this manner, the sleeve 82 and the prism 66 may be rotated about a horizontal axis for a purpose to appear hereinafter. A suitable knurl may be formed on the sleeve 82 in order to facilitate easy rotation.

In order to appreciate the advantages of the present invention, it would be well to understand the actual image layout upon an uncut film band, in the event that the longitudinal axis of the aircraft or the format side of the camera is not in line with the actual course flown over the ground along which a serial strip of photographs is to be obtained. It shall be assumed that the film advance through the focal plane was in the direction of flight. In Fig. 3 there is shown a topographical terrain feature, such as a highway indicated at 90, along which it is desired to obtain a series of overlapping aerial photographs. Assuming that there is a relatively strong crosswind, and the longitudinal axis of the aircraft is pointing in the direction of the arrow, the letters A, B and C will indicate a series of photographs of the highway as they are taken therealong. For purposes of later illustration, two crossroads D and E are indicated and it will be noted that crossroad D is within the overlap portion of the photographs A and B and the crossroad E is within the overlap portion of the photographs B and C.

For purposes of simplicity, the centers $P^1$, $P^2$, $P^3$ of the photographs A, B and C are shown as positioned on the highway 90. In Fig. 4, the uncut band F is shown as it actually looks after the film has been processed and unreeled. With the center points $P^1$, $P^2$, $P^3$ in alignment, it is noted that the crossroads D and E are offset from each other in the y-direction when comparing any two succeeding photographs, that is, crossroad D is offset in photograph B with respect to the corresponding image point in photograph A. Likewise, the image point for the crossroad E in photograph C is offset with respect to the corresponding image point of the crossroad D in photograph B. The present invention permits orthostereoscopic examination of vertical or parallel oblique aerial photographs in transmitted or reflected light, when freedom of mechanical orientation for stereoscopic viewing is not available. This condition prevails when the photographs are inseparably contained on their supporting media, which may be film or paper, or in fixed relationship to each other as negatives, or contact prints, on uncut rolls of film or paper, as the case may be.

In viewing the band when placed into the instrument, the center line passing through $P^1$, $P^2$, $P^3$ in Fig. 4 is positioned parallel with the base of observation of the present viewing device shown in Fig. 1, and more specifically, it is parallel to the rods 34 which establish the x-axis of the instrument. This permits the optical system, anywhere along the x-axis, to be parallel with a line drawn through the center points of the negatives or prints of the subject under observation.

A pair of corresponding image points, as e. g. the crossroad images D on photographs A and B of Fig. 4 are physically separated in the x-direction by the distance e. The receptors in their initial position as shown in Fig. 2 are, therefore, adjusted to such separation that the separation of the central rays 72 of both fields equals the separation e of the corresponding images, see Fig. 5. The viewing system can then be placed in a position at which both images are observed in or near the centers of the fields of vision. If the transverse separation or offset d of the two crossroad images is small, stereo fusion will be obtained and no further setting operation is necessary. In the exemplified case, Fig. 4, however, this offset is so large that stereo fusion cannot be obtained without considerable eye strain.

The present invention is designed to permit effortless fusing of the images resulting in strain-free depth perception. In Fig. 4, the offset in the y-direction of the crossroad images D is designated as d in photograph B. If the central ray of one or the other viewing systems is offset by this amount, both images can be made to appear in the center of the respective fields of vision with the result that fusion is readily obtained. Since both rhomboids are adapted for full 360° swing, any magnitude of y-offset within the overlapped area of two neighboring photographs can be absorbed by rotating one or both rhomboidal sections. Fig. 5 shows the solution by rotation of only one section. Since the variable length of the optical path between the image points and the erecting prisms 66 is formed by pencils of parallel rays, no change in magnification will occur if the receptors 42, 44 are moved with respect to the eyepieces 70, 70, along the x-axis. In addition, the rotation of the rhomboidal sections does not change the orientation of images seen through the respective eyepieces.

The present invention is designed to go still one step further. The aircraft flight conditions which resulted in photographs of a geometrical pattern on the terrain as shown in Fig. 3 and on the developed film as shown in Fig. 4 were produced by the directional difference W between the longitudinal axis of the airplane, represented by the arrow, and its true course over the highway 90 along which the photographic base lines $P^1P^2$, $P^2P^3$ are located.

It is known that for optimum stereoscopic effect it is necessary that the rotational orientation of the photographs to the base line of observation be the same as the terrain features show with regard to the photographic air base, which in Fig. 3 is located along the highway. However, as noted in Fig. 4, each of the photographic images of the highway and crossroads is rotatively displaced with respect to the base line of observation which is the line connecting the centers of the image fields of the eyepieces. This angle is denoted by the reference letter W of Fig. 3 and the value thereof is quite obviously, the drift angle for the aircraft. It is also the angle of rotation of the highway images in Fig. 4 with regard to the x-direction, which parallels the base of observation. If the angle W is larger than 15°, a deterioration of sterescopic depth becomes noticeable. If the angle W is permitted to reach 90°, depth deterioration would be complete, i. e., no depth impression would be perceived although the fusion of corresponding images is unimpaired. This condition e. g. applies if the film advance from exposure to exposure was transversely to the photographic base line. In order to restore the optimum stereoscopic effect, erecting prisms 66 have been provided by the rotation of which the images received in the eyepiece fields, specifically, the images of the crossroads DA on the photograph A and DB on the photograph B, may be rotated through the angle W so that the highway 90 lies parallel with the base line along the x-axis as shown in Fig. 6. In this manner then, the full optimum depth perception available is restored.

From the foregoing description, it will be appreciated that the present invention provides a universal stereoscopic viewing instrument which is adapted to examine serial overlapping photographs when still in their uncut condition, that is, where the individual photographs have not been previously mechanically oriented. In addition, the present invention permits the bringing into binocular view corresponding image details contained on adjacent exposures from uncut film bands in such reciprocal orientation that optimum spatial perception of the three dimension of the terrain surface under study is maintained regardless of any flight and camera operation conditions that may have been present during the taking of the exposures. While only one specific film band orientation has been illustrated and described, it will be understood that this is for brevity only and that various other photographic orientation may be utilized. For example, the principles of the invention may be incorporated regardless of the direction of film advance in the camera magazine, with respect to the heading of the aircraft, that is, the film advance may be transverse or along the flight path, and regardless of the rotational setting of the camera itself in the airplane fuselage.

We claim:

1. A stereoscopic viewing device comprising a base frame having a table thereon for supporting a strip of photographs to be viewed stereoscopically, a carriage mounted above the table and being adapted to be moved rectilinearly thereupon, said carriage having mounted thereon for movement therewith an optical system including a pair of relatively stationary eyepieces and a rhomboid prism operatively associated with each of said eyepieces, each of said rhomboid prisms being mounted for sliding movement upon said carriage relative to its corresponding eyepiece along a common line lying in the plane of the base line of observation for the optical system, each of said prisms being mounted for pivotal movement about an axis normal to said common line traced by said sliding movement, each of said rhomboid prisms having two parallel reflecting surfaces which are inclined to the vertical, the first one of said surfaces being positioned above a photograph to be viewed for receiving image forming rays therefrom and directing them onto the second surface from whence they are directed into the corresponding eyepiece, each of said eyepieces being adapted respectively to view the images reflected from each of said second surfaces along an optical path a portion of which is in coincidence with each of said axes of pivotal movement.

2. A stereoscopic viewing device comprising a base frame having a table thereon for supporting a strip of photographs to be viewed stereoscopically, a stereoscopic optical system arranged above the table and being adapted to be moved rectilinearly thereon, said optical system including a pair of eyepieces and a prism operatively associated with each of said eyepieces, each of said prisms having two parallel reflecting surfaces which are inclined to the vertical, the first one of said surfaces being positioned above a picture to be viewed for receiving image forming rays therefrom and directing them onto the correlated second surface from whence they are reflected into the corresponding eyepiece, the central ray of said reflected image forming light rays being substantially in the plane of the base line of observation of the optical system, means for rotatably mounting each prism for movement about an axis which is substantially coincident with the central ray reflected by the second surface whereby the angle between the optical axis of the prism and the base line may be varied, an image erecting prism means interposed in the optical paths between each of said second surfaces and the corresponding eyepiece, each of said erecting prism means being mounted for rotation about an axis coincident with a portion of the respective optical paths whereby the image transmitted therethrough may be rotated to correspond to the angle between its associated prism and the base line of observation.

References Cited in the file of this patent

UNITED STATES PATENTS

| | | |
|---|---|---|
| 1,494,728 | Beyerlen | May 20, 1924 |
| 2,647,318 | Grondona | Aug. 4, 1953 |
| 2,692,531 | Waterworth et al. | Oct. 26, 1954 |